United States Patent
Jacobs

(10) Patent No.: US 7,480,555 B2
(45) Date of Patent: Jan. 20, 2009

(54) METHOD FOR CONTROLLING CENTRIFUGAL CLUTCH ENGAGEMENT USING ENGINE TORQUE REQUESTS

(75) Inventor: Craig S. Jacobs, Canton, MI (US)

(73) Assignee: Eaton Corporation, Cleveland, OH (US)

(*) Notice: Subject to any disclaimer, the term of this patent is extended or adjusted under 35 U.S.C. 154(b) by 616 days.

(21) Appl. No.: 11/014,419

(22) Filed: Dec. 16, 2004

(65) Prior Publication Data

US 2006/0135317 A1 Jun. 22, 2006

(51) Int. Cl.
F02D 28/00 (2006.01)
F02D 45/00 (2006.01)
F02P 5/15 (2006.01)

(52) U.S. Cl. ..................................... 701/101
(58) Field of Classification Search ................... 701/101
See application file for complete search history.

(56) References Cited

U.S. PATENT DOCUMENTS

| | | | |
|---|---|---|---|
| 3,580,372 A | 5/1971 | Schiefer | |
| 3,696,901 A | 10/1972 | Henry | |
| 3,810,533 A | 5/1974 | Densow | |
| 4,361,060 A | 11/1982 | Smyth | |
| 4,361,065 A | 11/1982 | Wilcox et al. | |
| 4,493,228 A * | 1/1985 | Vukovich et al. | 477/109 |
| 4,515,040 A * | 5/1985 | Takeuchi et al. | 477/43 |
| 4,593,580 A | 6/1986 | Schulze | |
| 4,610,343 A | 9/1986 | Hikari | |
| 4,646,891 A | 3/1987 | Braun | |
| 4,648,290 A | 3/1987 | Dunkley et al. | |
| 4,649,331 A * | 3/1987 | Jahns | 318/798 |
| 4,698,764 A * | 10/1987 | Inagaki et al. | 701/62 |
| 4,720,793 A * | 1/1988 | Watanabe et al. | 701/54 |
| 4,754,665 A | 7/1988 | Vandervoort | |
| 4,819,779 A | 4/1989 | Nickel et al. | |
| 4,821,590 A | 4/1989 | Tury et al. | |
| 4,850,236 A | 7/1989 | Braun | |
| 4,899,609 A | 2/1990 | Nagata | |
| 5,281,902 A | 1/1994 | Edelen et al. | |
| 5,335,566 A | 8/1994 | Genise et al. | |
| 5,370,013 A | 12/1994 | Reynolds et al. | |
| 5,409,432 A | 4/1995 | Steeby | |
| 5,437,356 A | 8/1995 | Lohr | |
| 5,441,137 A | 8/1995 | Organek et al. | |
| 5,481,170 A | 1/1996 | Edelen et al. | |
| 5,490,063 A | 2/1996 | Genise | |
| 5,509,867 A | 4/1996 | Genise | |
| 5,582,558 A | 12/1996 | Palmeri et al. | |
| 5,589,986 A | 12/1996 | Shibata | |
| 5,600,557 A * | 2/1997 | Ogawa | 701/57 |
| 5,620,392 A | 4/1997 | Genise | |
| 5,730,269 A | 3/1998 | Hersey | |
| 5,735,771 A | 4/1998 | Genise | |
| 5,775,639 A | 7/1998 | Fage | |
| 5,820,104 A | 10/1998 | Koyano et al. | |
| 5,957,001 A | 9/1999 | Gualtieri et al. | |

(Continued)

*Primary Examiner*—Jack W Keith
*Assistant Examiner*—Ari M Diacou
(74) *Attorney, Agent, or Firm*—Brooks Kushman P.C.

(57) ABSTRACT

A method for controlling a centrifugal clutch in a heavy-duty vehicle powertrain uses an engine torque request for a controller including a vehicle engine controller. A clutch controller develops an engine speed request based upon driver input. The engine speed request is converted to the engine torque request to effect smooth vehicle launch engagement of the clutch.

12 Claims, 6 Drawing Sheets

U.S. PATENT DOCUMENTS

| | | |
|---|---|---|
| 5,974,354 A | 10/1999 | Janecke et al. |
| 5,974,906 A | 11/1999 | Stine et al. |
| 5,980,426 A * | 11/1999 | Kamada et al. ............. 477/143 |
| 6,015,366 A | 1/2000 | Markyvech et al. |
| 6,022,295 A | 2/2000 | Liu |
| 6,126,570 A | 10/2000 | Bohm et al. |
| 6,149,545 A | 11/2000 | Genise et al. |
| 6,321,150 B1 * | 11/2001 | Nitta ........................... 701/29 |
| 6,371,081 B1 * | 4/2002 | Hawkins et al. ............. 123/352 |
| 6,484,860 B1 | 11/2002 | Bassett |
| 6,502,027 B2 * | 12/2002 | Saotome et al. ............... 701/67 |
| 6,502,476 B2 | 1/2003 | Genise |
| 6,539,820 B2 | 4/2003 | Markyvech |
| 6,561,948 B2 | 5/2003 | Markyvech et al. |
| 6,564,136 B2 * | 5/2003 | Asumi et al. .................. 701/70 |
| 6,571,923 B2 | 6/2003 | Kummer |
| 6,574,535 B1 * | 6/2003 | Morris et al. ................. 701/22 |
| 6,609,602 B2 | 8/2003 | Gochenour et al. |
| 6,633,806 B2 | 10/2003 | Gochenour |
| 6,634,476 B2 | 10/2003 | Inoue et al. |
| 6,641,504 B2 | 11/2003 | Genise et al. |
| 7,232,021 B2 * | 6/2007 | Abusamra et al. ........ 192/105 C |
| 7,306,084 B2 * | 12/2007 | AbuSamra et al. .... 192/105 CP |
| 7,318,513 B2 * | 1/2008 | AbuSamra et al. ...... 192/103 A |
| 7,338,409 B2 * | 3/2008 | Ronge et al. ................. 477/180 |
| 7,367,440 B2 * | 5/2008 | AbuSamra et al. .... 192/105 CP |
| 2001/0005805 A1 * | 6/2001 | Saotome et al. ............... 701/67 |
| 2002/0116111 A1 * | 8/2002 | Sayman ....................... 701/110 |
| 2002/0137595 A1 * | 9/2002 | Markyvech et al. ........... 477/77 |
| 2002/0137596 A1 * | 9/2002 | Markyvech ................... 477/83 |
| 2003/0033069 A1 * | 2/2003 | Bauer et al. ................... 701/65 |
| 2003/0045987 A1 * | 3/2003 | Gochenour ................... 701/51 |
| 2003/0065432 A1 * | 4/2003 | Shuman et al. ............... 701/48 |
| 2003/0109358 A1 * | 6/2003 | Sakamoto et al. ........... 477/109 |
| 2003/0143957 A1 * | 7/2003 | Lyon ......................... 455/67.1 |
| 2003/0145579 A1 * | 8/2003 | Surnilla ....................... 60/285 |
| 2003/0171867 A1 * | 9/2003 | Nakamori et al. ............. 701/54 |
| 2003/0186782 A1 * | 10/2003 | Genise ....................... 477/111 |
| 2003/0187566 A1 * | 10/2003 | Hess et al. ................... 701/103 |
| 2003/0225501 A1 * | 12/2003 | De La Salle et al. .......... 701/93 |
| 2006/0172849 A1 * | 8/2006 | Oliver et al. ................. 475/269 |

* cited by examiner

METHOD FOR CONTROLLING CENTRIFUGAL CLUTCH ENGAGEMENT USING ENGINE TORQUE REQUESTS

BACKGROUND OF THE INVENTION

1. Field of the Invention

The invention relates to a centrifugal clutch in an automotive powertrain and a method for controlling clutch engagement.

2. Background Art

In the design of an automated heavy-duty vehicle powertrain system with an internal combustion engine and a multiple-ratio transmission, it is known practice to include a centrifugally operated clutch for coupling the engine to the torque input side of the transmission. The centrifugally operated clutch functions as a master friction clutch that is engageable during vehicle launch. The engagement is a function of throttle position and other system variables, such as engine speed, transmission input shaft speed, transmission output shaft speed, and engine torque. The transmission typically is a multiple-ratio transmission in which ratio changes are controlled using an electronic microprocessor controller. The transmission may be controlled manually, however, by the operator.

The engine may include a controller for regulating fuel supply to the engine based on a closed loop control technique using a microprocessor controller whereby the controller provides a target engine speed and a target engine torque. In the case of a spark ignition engine, spark timing can be used to achieve momentary torque delivery interruption during transmission ratio shifts. In the case of a diesel compression ignition engine, momentary torque interruption can be achieved using engine fueling control during transmission ratio shifts.

Centrifugally operated clutches in powertrains of this type are well known in the prior art. They typically include centrifugally actuated weights that are rotatable with a driving member coupled to the engine. The weights move freely outward under the effect of centrifugal force to cause the driving member to frictionally engage a driven power output member. Examples of a centrifugally operated clutch of this type can be seen by referring to U.S. Pat. Nos. 6,502,476; 5,441,137; 5,730,269; and 4,610,343.

In heavy duty vehicle powertrains, acceptable vehicle launch performance is achieved using closed loop control of engine speed variables. The clutch remains engaged as the controller allows dynamic shifting. The clutch remains engaged at engine speeds greater than the highest expected speed at which downshifts are initiated. It remains engaged also at engine speeds that are greater than the minimum expected engine speed after an upshift. This is accomplished simultaneously with control of engine fueling of the engine during a launch thereby causing the engine speed and torque to equal or not exceed target values. These are determined as a function of sensed input signals, which may be throttle position, engine speed, engine torque, transmission input speed, transmission output speed, transmission ratio, and clutch slip.

Control of the vehicle engine in a heavy duty powertrain of this type is successful if the engine is calibrated to accept engine speed limit requests from the vehicle controller. The control functions discussed in the preceding paragraphs are not compatible with control of a heavy-duty powertrain of known design that does not include an engine calibrated to respond to engine speed requests. Even if the engine is designed to accept engine speed requests, it may not be calibrated for all vehicle applications that might be used with a transmission with a centrifugally actuated clutch. A control response to a speed limit request is needed to achieve a smooth launch. If an engine of this type is used with a transmission with a centrifugally actuated clutch that does not respond to a clutch control strategy using speed limit requests, the clutch will function poorly and a launch will be characterized by undesirable inertia torque disturbances as the friction surfaces of the centrifugal clutch are engaged.

SUMMARY OF THE INVENTION

The invention includes a method for controlling a centrifugally actuated master clutch in a heavy duty powertrain that responds to torque requests. All electronically-controlled engines for heavy-duty powertrains that are capable of responding to engine speed requests, as described above, are capable also of responding to torque requests regardless of whether the engine manufacturer has calibrated the engine to correctly respond to speed requests. It is an objective of the invention, therefore, to provide a centrifugal clutch controller that is more universally acceptable for controlling engines in a heavy duty vehicle powertrain. This is accomplished by using the speed output of a known clutch controller and using it as an input to the controller of the present invention to produce a torque request that is distributed to the clutch controller to achieve high quality clutch engagements during launch without the need for a speed limit input. The controller of the invention includes a state filter, which provides a target speed and a target acceleration to effect an acceleration feed-forward value. That value is used, together with an engine inertia calibrated value, to produce an actual feed-forward torque. The inertia feed-forward torque then is combined with a calibrated engine friction feed-forward torque to produce feed-forward torque.

The filter is used also to generate a requested speed and acceleration to effect a smooth and fast acceleration buildup time. An acceleration signal is fed forward as a torque value after it is multiplied by an engine inertia term. This allows the controller to request the extra torque required to accelerate or decelerate the engine during launch.

The controller develops also a computed acceleration, which is multiplied by an estimate of the engine friction torque to produce a friction feed-forward torque. That acceleration term is integrated to produce a target engine speed, which is compared to an actual engine speed. The error in engine speed then is fed to a disturbance rejection system, which produces a feedback torque value. The error also is multiplied by a gain factor that is integrated before it is combined with the feed-forward torques in the computation of a torque request.

DETAILED DESCRIPTION OF THE PREFERRED EMBODIMENT(S)

Figure 5A:
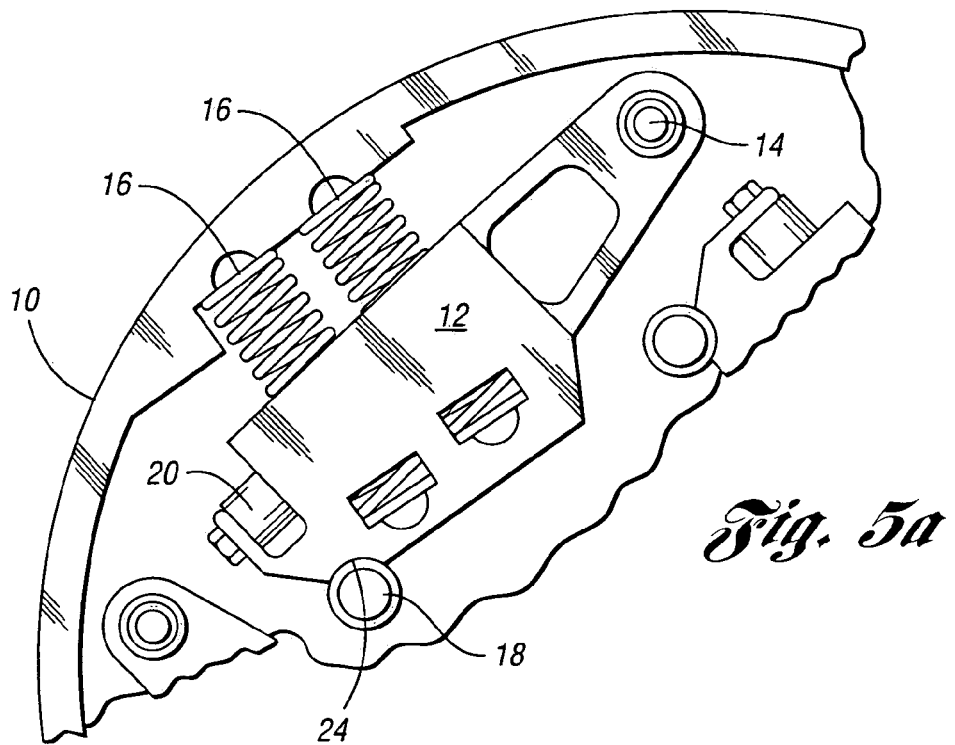
FIG. 5a is a partial schematic view of a centrifugal clutch in which the centrifugally operated elements are in the clutch release position.
Figure 5B:
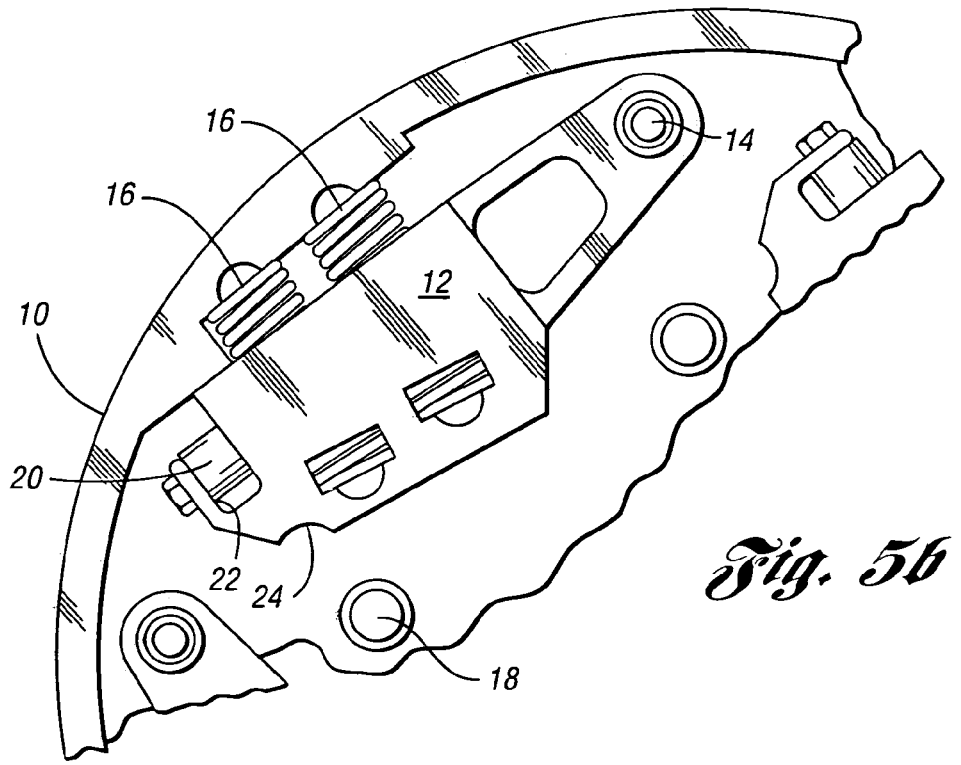
FIG. 5b is a partial schematic view of the centrifugal clutch of FIG. 5a wherein the centrifugally actuated elements are in the clutch engaged position.
Figure 6:
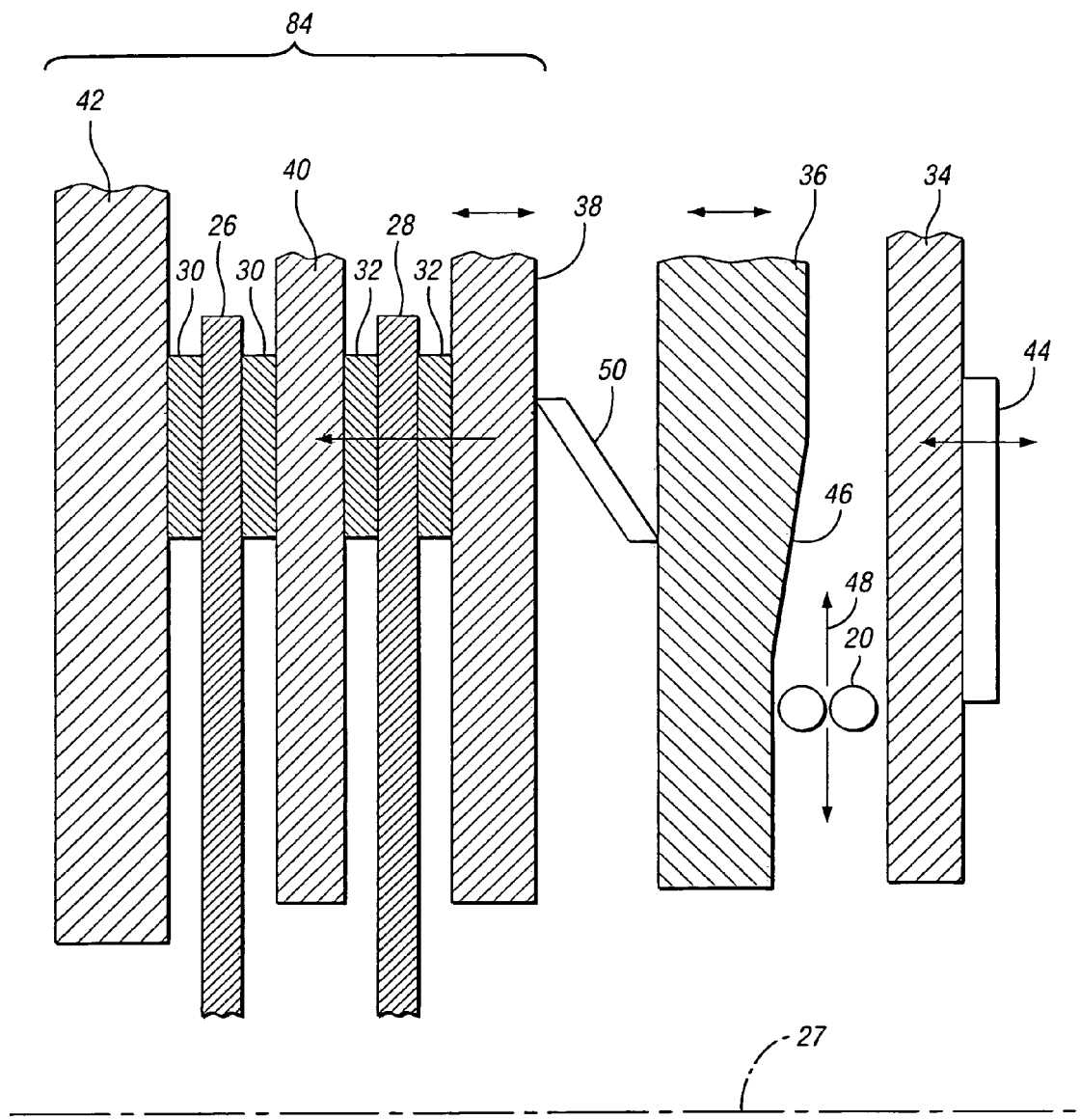
FIG. 6 is a schematic view showing the friction plates and the friction disks of a centrifugal clutch as seen from the vantage point of a secant plane parallel to the axis of the clutch.

FIGS. 5a, 5b, and 6 illustrate a centrifugal clutch that functions as a master clutch in a heavy duty powertrain for delivering engine torque from an engine crankshaft to a power input member of a multiple-ratio, heavy-duty transmission. The clutch structure includes a clutch housing at 10 in FIGS. 5a and 5b. The housing 10 is mounted on an engine flywheel and rotates with the engine crankshaft. Four flyweights 12 are pivoted at 14 to the housing 110. Each flyweight 12 has one or more return springs 16 situated between an intermediate portion of the flyweights and the housing 10. The return springs 114 bias the flyweights 12 radially inward about the pivot location 14. The flyweights normally are urged by springs 16 into engagement with stops 18 carried by the housing 10. The stops 18 may include the yieldable bumper or sleeve to cushion engagement of each flyweight with a stop 18.

Each flyweight 12 carries one or more rollers 20. Each roller is supported for rotation in a recess 22 at the active end of the flyweight. The rollers are journaled about an axis that may intersect the pivot location shown at 14.

When the centrifugal clutch is at rest, the flyweights 12 assume the position shown in FIG. 5a. Each flyweight engages a stop 18 at a bumper recess 24.

FIG. 6 shows the relationship of the friction elements of the centrifugal clutch with respect to the axis of rotation of the centrifugal clutch, the latter being shown at 27 in FIG. 6. Friction plates 26 and 28 carry friction pads shown at 30 and 32, respectively. The plates are splined to a torque input shaft for the transmission. Clutch plates 34, 36, 38, and 40 are connected to and rotate with the engine flywheel, shown schematically at 42. The clutch may include an adjustment mechanism 44 for friction element wear take-up. The mechanism 44 may form a part of the reaction plate 34.

The rollers 20 are situated between reaction plate 34 and clutch plate 36. A ramp surface 46 is formed on the clutch plate 36 whereby the separation of the reaction plate 34 from the clutch plate 36 is variable. The rollers 20, as they are moved in the direction of arrow 48, engage the ramp 46, thereby applying a clutch engaging force on the clutch plate 36 in a lefthand direction. That force is transmitted to the friction disks by a diaphragm plate spring, shown at 50. The spring 50 is preloaded so that the clamping force increases as the rollers 20 move radially outward. The clamping force is capped by a calibrated preload on the spring 50.

Figure 3:
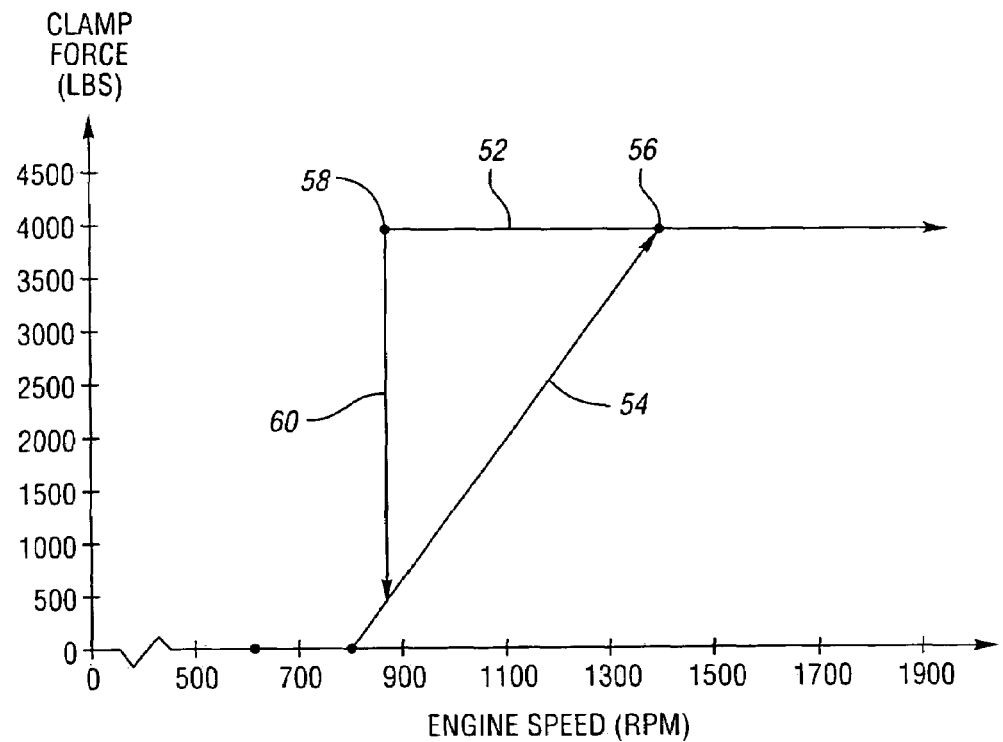
FIG. 3 is a plot that shows the relationship of engine speed to centrifugally clutch clamping force.

The clamping load created by the centrifugal clutch of FIGS. 5a, 5b and 6 is plotted in FIG. 3. The capped value of the clamping load is indicated in FIG. 3 at 52. In a typical embodiment, the engine speed will increase from a value of about 800 rpm to a value of about 1400 rpm as the clamping force on the friction disks increases generally linearly, as shown at 54 in FIG. 3. After the preload on the spring 50 is exceeded, the clamping force is the capped value at 52. The force created by the centrifugal flyweights required to move the rollers up the ramp portion 46 of the clutch plate 36 is greater than the force required to retain the rollers on the flat portion of the clutch plate 36 as the force of the return springs 16 continues to oppose the centrifugal force of the flyweights.

Thus, there is a difference between the engine speed value at 56 and the engine speed clutch release clamping force value at 58. As the clutch is released, the clamping force will decrease rapidly, as shown at 60, as the engine speed approaches its initial value prior to clutch engagement.

Reference may be made to U.S. Pat. No. 5,901,823 for a description of a clutch in which the maximum force applied to the friction elements uses a spring to limit the maximum force.

Figure 4:
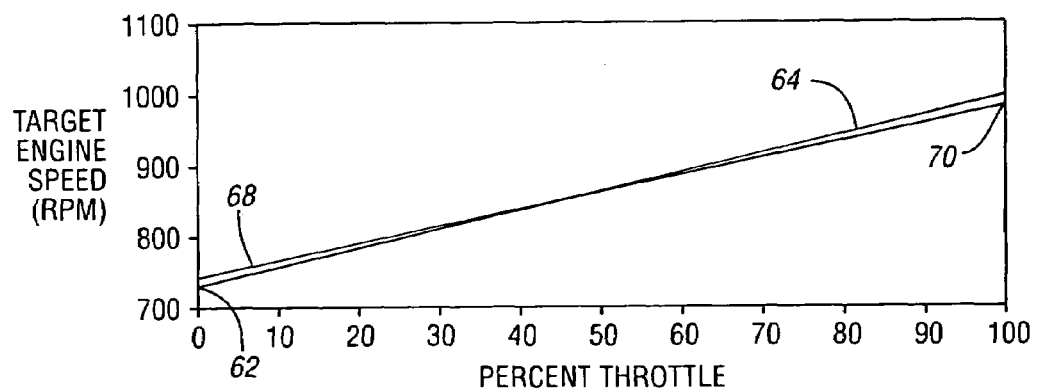
FIG. 4 is a plot of target engine speed as a function of percentage throttle opening.

FIG. 4 shows a plot of target engine speed for a launch as a function of throttle position. For any given centrifugal clutch design, there is a particular target engine speed and throttle position relationship for which the clutch will function with maximum smoothness during a launch. The relationship between target engine speed and throttle position can be calibrated so that the clutch begins to produce torque at a speed slightly above a calibrated setting. The slope of the light throttle plot 64 in FIG. 4 and the slope of the heavy throttle speed limit plot 68 are such that a wide range of good starting performance can be achieved throughout a wide range of throttle positions.

The plots shown in FIG. 4 are empirically determined. They are plotted so that the heavy throttle high speed point 70 is placed at an engine speed that results in approximately 25-30% of the clutch peak torque capacity. A corresponding high speed point for the light throttle also can be determined empirically.

The calibrated characteristics shown in FIG. 4, are of importance in developing a so-called "touch point speed," which is the speed at which the clutch exhibits incipient torque during a launch. The so-called touch point speed during an attempt to engage a gear when the vehicle is stopped would be different for differing throttle settings, and would be different from a touch point speed that occurs when an attempt is made to effect engagement of a gear following the initial launch. This characteristic of the clutch is described in U.S. Pat. No. 6,539,820, and reference may be made to that patent to supplement the present disclosure.

Figure 1:
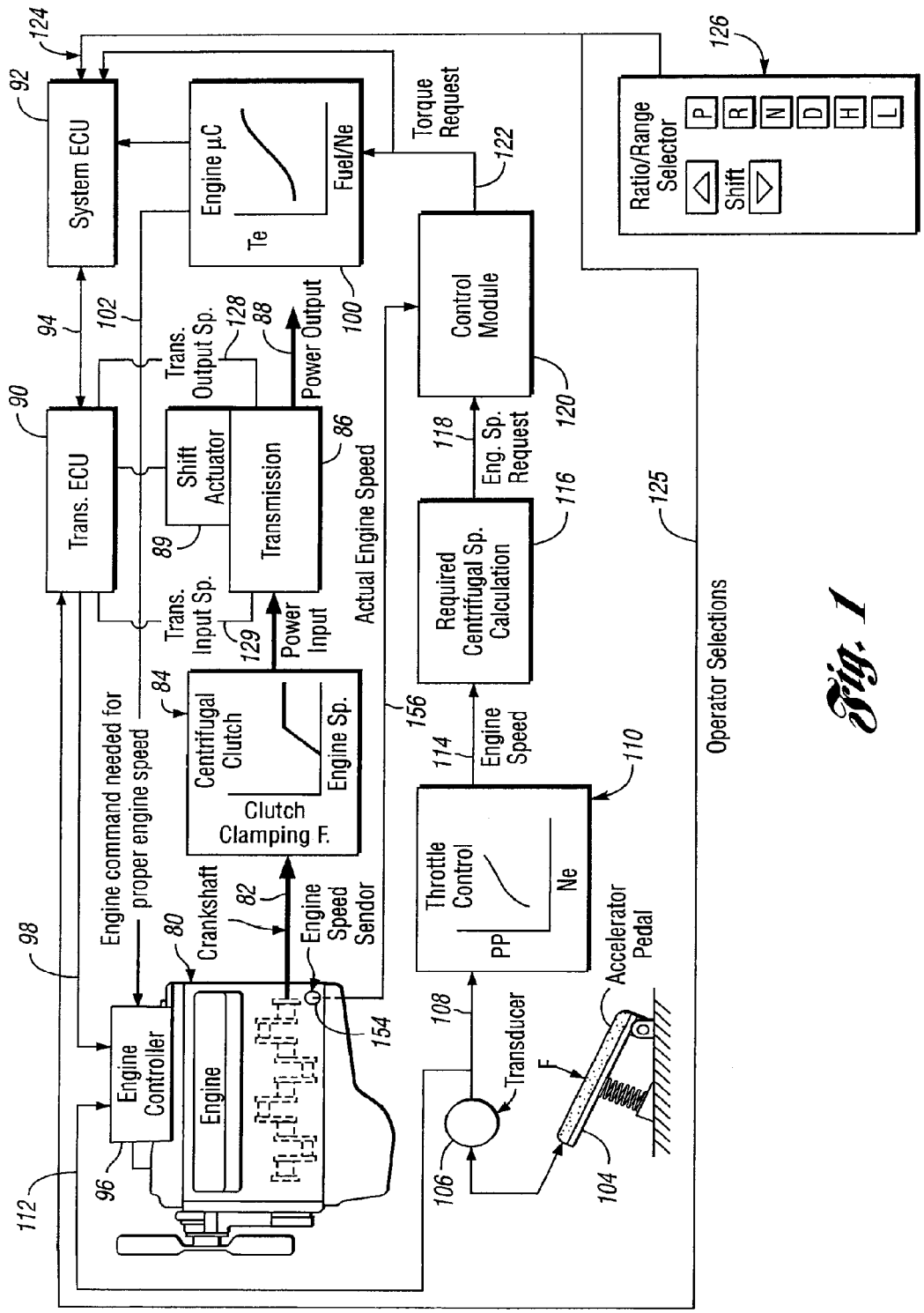
FIG. 1 is a schematic system diagram of the overall control system with a centrifugal clutch in the powertrain for a heavy duty vehicle.

In the system diagram of FIG. 1, the engine is shown at 80. It includes a crankshaft 82, which distributes torque to the centrifugal clutch previously described. The clutch is generally shown in FIG. 1 at 84. Power from the power output side of the clutch is distributed to the power input side of the transmission 86. The transmission, in turn, delivers power at 88 to the vehicle differential-and-axle assembly for powering the traction wheels of the vehicle (not shown). The transmission 86 may include multiple-ratio gearing and non-synchronized jaw clutches, which establish and disestablish multiple torque flow paths from the clutch to the power output element 88. The clutches are actuated and released by clutch actuators, such as electric motor mechanisms. In a typical heavy-duty vehicle transmission, ratio shifts are effected by a shift actuator 89 under the control of a transmission electronic control unit 90. An overall system electronic control unit 92 communicates with the transmission electronic control unit 90, as indicated by the bidirectional signal flow path 94. Examples of heavy-duty vehicle transmissions are disclosed in U.S. Pat. Nos. 6,561,948; 5,370,013; 5,509,867; 6,149,545; and 5,620, 392, which are assigned to the assignee of the present invention. It is possible, however, to use other transmission types in practicing the present invention, such as planetary transmissions with pressure-operated-friction clutches and brakes.

The engine includes an engine controller 96, which receives engine commands from the transmission electronic control unit 90 through a signal flow path 98. It also receives engine commands required for proper engine speed from an engine microprocessor unit 100, the latter distributing command signals to the engine controller through a signal flow path 102.

FIG. 1 shows an accelerator pedal 104 under the control of the vehicle operator. During a vehicle launch, the accelerator pedal is depressed. The motion of the accelerator pedal is received by a transducer 106, which develops a pedal position signal at 106 that is received, as shown at 108, by a throttle control module 110. The pedal position signal is distributed also to the engine controller, as shown at 112, to effect appropriate motion of the engine throttle.

Figure 2:
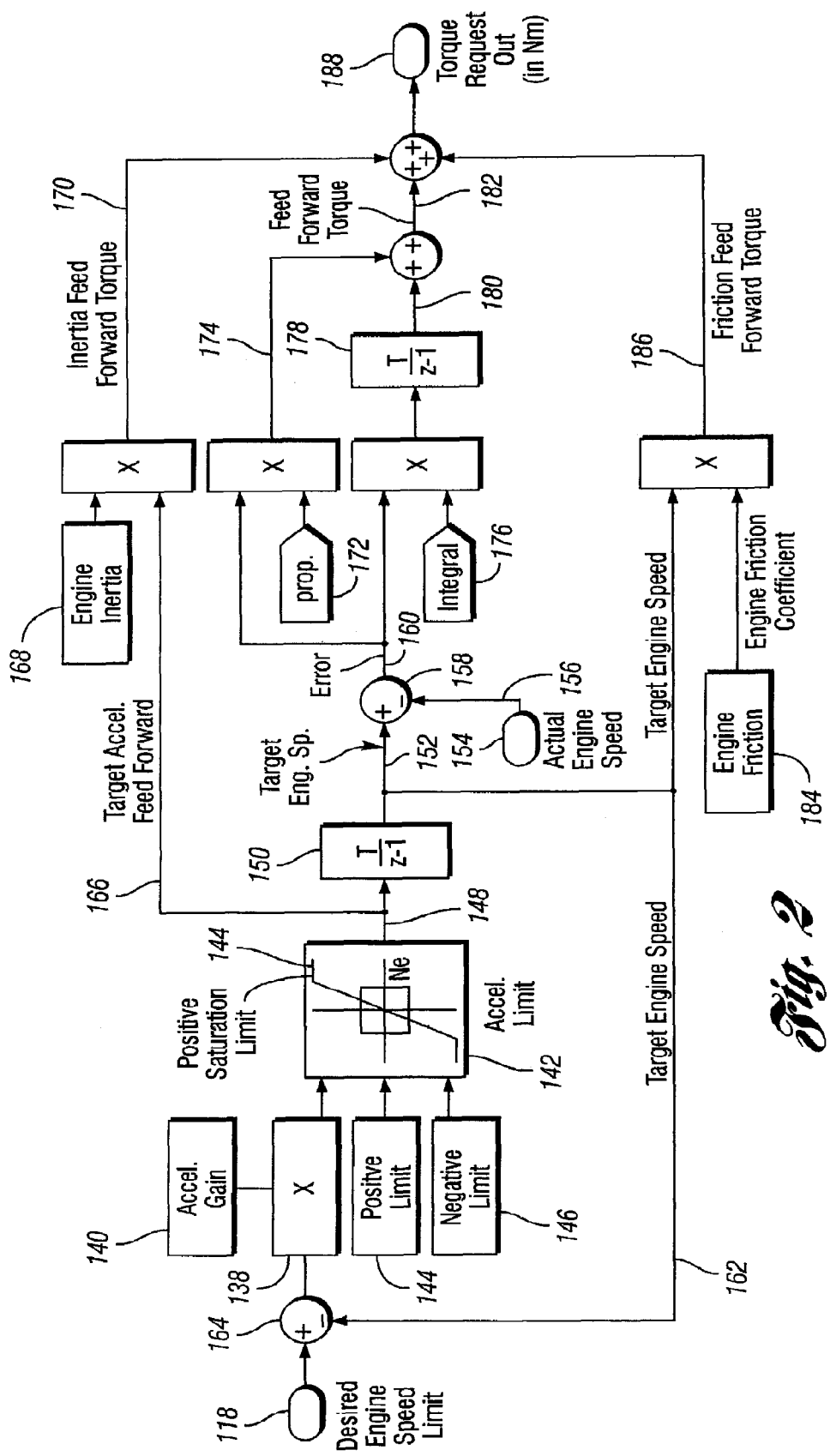
FIG. 2 is a schematic block diagram of a control module used to develop a torque request used in the system of FIG. 1.

The module 110 includes data, stored in memory, that indicates a relationship between pedal position and engine speed. The pedal position information, transmitted in the form of speed data, as shown at 114, is distributed to module 116, which carries out a calculation to determine the required centrifugal speed for establishing a speed request at data link or signal flow path 118. This will be described with reference to FIG. 2.

The engine speed request at 118 is received by control module 120, which establishes a torque request at data link or signal flow path 122. This also will be described with reference to FIG. 2.

The torque request at 122 is distributed to the system electronic control unit 92, which carries out several control functions, including the determination of clutch and brake pressures for the transmission. The torque request at 122 is delivered also to engine microprocessor unit 100. The information received by the microprocessor unit 100 develops an engine command that is needed for the proper engine speed, which is distributed, as previously indicated, to the engine controller over a data link or signal flow path 102.

Figure 1A:
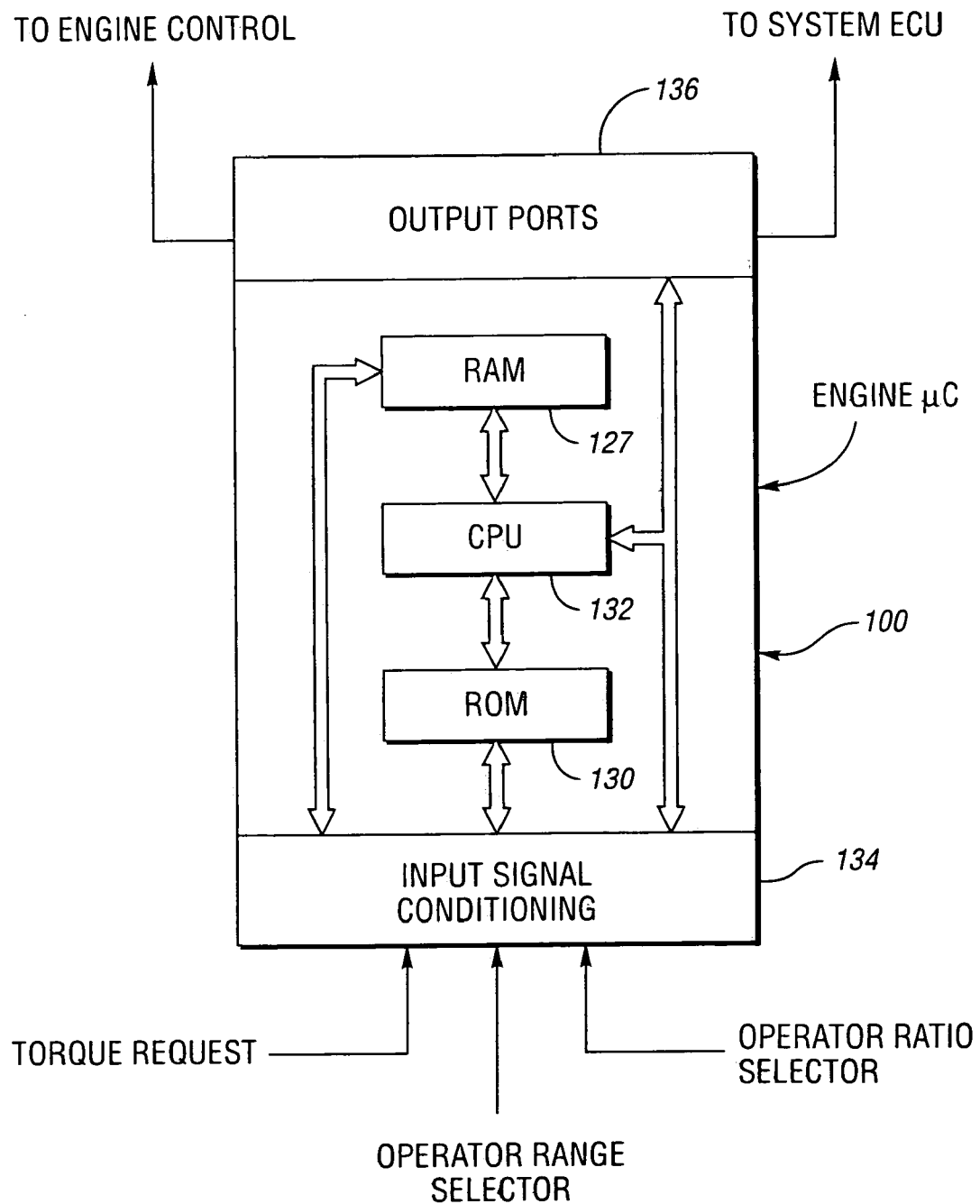
FIG. 1a is a generic schematic block diagram of a microprocessor controller that may be used in the control system of FIG. 1.

The engine microprocessor unit 100, which is illustrated in a generic, schematic form in FIG. 1a, includes a memory in which a three-dimensional relationship between engine torque, engine speed, and engine fuel rate is stored. That relationship is established by calibration. The torque request at 122 is used in the calibrated three-dimensional relationship by the engine microprocessor to develop the engine command at 102.

As previously indicated, the engine controller and the engine microprocessor respond to a torque request, rather than an engine speed request. The system shown in FIG. 1, therefore, can be used to establish engine commands for a powertrain that does not include an engine calibrated to receive engine speed requests.

In the system of FIG. 1, the operator may select, in a known manner, the transmission ratio that is desired, as well as a range of ratios. Each range can contain multiple ratios. The ratios for one range are stepped in known fashion, although the ratio separations in each range may be similar. The ratio and range selections are transferred over signal flow path 124 to the system electronic control unit, shown at 92, and are used by the transmission electronic control unit 90, together with transmission output speed information distributed to the transmission electronic control unit through signal flow path 128, as well as transmission input speed information received through signal flow path 129. A ratio and range selector is schematically indicated at 126. The signal flow path for the ratio selections is shown in FIG. 1 at 125.

FIG. 1a is a generic schematic diagram of a known microprocessor that may be used to establish engine commands for the engine 80. It includes a random access memory 127 (RAM), a read-only memory 130 (ROM) and a central processing unit 132 (CPU). The CPU receives input data, including an engine torque request, and operator ratio and range selections after those input signals are conditioned at 134.

The read-only memory 130 contains information of the kind previously described with reference to FIG. 1, including the centrifugal clutch data at 84, the engine control data at 100 and the throttle control data at 110, as well as control algorithms that will be described with reference to the modules 116 and 120 for computing engine speed requests and engine torque requests.

The CPU receives the variables in RAM 127 following input signal conditioning and will execute the algorithms stored in read-only memory 130 using the variables in RAM to produce the necessary outputs at the output ports 136.

The required centrifugal speed calculation module 116 in FIG. 1 includes a microprocessor of the kind generically illustrated in FIG. 1a. The information received by the module 116 includes engine speed. The output ports would distribute an engine speed request signal, as shown at 118. The output engine speed request for the module 116 is computed using an algorithm, stored in memory (ROM), expressed as follows:

OUTPUT(K)=LESSER OF [INPUT (K)−OUTPUT (K−1)] AND LIMIT, PLUS OUTPUT (K−1)

where: K=a time sample
Output (K)=new output speed request
Output (K−1)=the last output during the preceding control loop of the microprocessor
Input (K)=the current speed value The engine speed request at the output side of the module 116 is a time sample of speed in a given control loop of the microprocessor. Its value is equal to the current speed represented by the current time sample constant K less the corresponding time sample for the speed during the previous control loop of the microprocessor. The time sample for the previous or last control sample is expressed by the calibration constant K−1. The difference between the current input speed and the last output speed is compared to a calibration parameter that establishes a limit on the rate of change of the speed signal. The new output speed is equal to the smaller of the limit value and the difference between the input speed during the current control loop and the output speed for the previous or last control loop, plus the output speed for the previous or last control loop. The result is the new output speed for the current time sample. This calculation prevents an undesirable fast change in the engine speed request, and it avoids a harsh clutch engagement, such as an engagement that would be obtained when a clutch is popped.

The engine speed request at 118, developed at 116, is distributed to the control module 120, as previously explained. The control module 120 is shown in diagrammatic form in FIG. 2. The module 142 contains a positive acceleration limit 144, as well as a negative limit at 146. The module 142 establishes a limiting threshold or saturation level for positive acceleration, as shown at 144. The module 142, which acts as a filter, gives a smooth, fast acceleration rise time with little overshoot. During a vehicle launch, the module 142 establishes a target acceleration at 148, which is integrated, as shown at 150, to produce a target engine speed at 152. The actual engine speed, which is received from an engine speed sensor 154, seen in FIG. 1, is distributed to the control module through data link or signal flow path 156.

The actual engine speed signal at 154 is compared to the target engine speed at comparator 158 to determine an error at 160.

The target engine speed at 152 is fed back along signal flow path 162 and is compared to the desired engine speed at 164. The difference in the speed values at 118 and 162 is multiplied at 138 by the acceleration gain factor 140, which results in an acceleration value that is distributed to the filter module 142.

The target acceleration is a feed-forward term, as shown at 166, which is multiplied by a calibrated engine inertia term 168 to produce an inertia feed-forward torque at 170. The feed forward feature allows the controller time to request the extra engine torque required to accelerate the engine.

The error term at 160 is multiplied by a proportional term 172 to produce a feed forward torque value 174. The error is multiplied also by an integral term 176, and that value is integrated by a discrete sub-module 178 to produce a torque term 180. The torque term at 174 is added to the computed torque term at 180 to produce a feed forward torque at 182.

An engine friction coefficient at 184 is multiplied by the target engine speed at 152 to produce a feed-forward friction torque term at 186. The torque values at 170, 182 and 186 are added to produce an output torque request, as shown at 188. The feed forward value at 186 cancels out the effect of the viscous friction of the engine at the requested speed.

The feedback torque at 182 is that torque that is needed to achieve the proper engine speed component of the engine commands distributed to the controller over data link or signal flow path 102 seen in FIG. 1.

Although separate electronic controllers are described, it will be apparent that a single electronic controller or microprocessor unit for the engine, the system and the clutch could be used incorporating the microprocessor unit architecture schematically illustrated in generic form in FIG. 1*a*.

Although embodiments of the invention have been illustrated and described, it is not intended that these embodiments illustrate and describe all possible forms of the invention. Rather, the words used in the specification are words of description rather than limitation. It is understood that various changes may be made without departing from the spirit and scope of the invention.

What is claimed is:

1. A method for controlling engagement of a centrifugal master clutch in a vehicle powertrain having a throttle-controlled internal combustion engine, a multiple-ratio transmission and a master clutch controller for controlling clutch engagement during launch and acceleration as torque from the engine is delivered to a torque input member of the transmission, and an engine controller responding to operating variables that are determined in successive control loops, the engine having a driver operated vehicle acceleration pedal, the method comprising:
    calculating an engine speed request;
    converting the engine speed request to an engine torque request;
    developing an engine control command that is responsive to changes in engine torque request whereby launch of the vehicle is characterized by controlled and timed clutch engagement that effects engagement smoothness;
    the step of converting the engine speed request to an engine torque request comprising establishing a target acceleration feed forward value by converting the engine speed request using a precalculated acceleration gain factor;
    integrating the target acceleration feed forward value to obtain a target engine speed;
    comparing target engine speed to actual engine speed to determine a speed error;
    converting speed error to a speed error feed forward torque;
    converting the target acceleration feed forward value to an inertia feed-forward torque; and
    combining speed error feed-forward torque, inertia feed-forward torque and an engine friction feed-forward torque, to effect the torque request.

2. The method set forth in claim 1 wherein the friction feed-forward torque is determined by multiplying target engine speed by an engine friction coefficient.

3. The method set forth in claim 2 wherein the inertia feed-forward torque is determined by multiplying target feed-forward acceleration by a calibrated engine inertia parameter indicative of mass of rotary elements of the engine.

4. The method set forth in claim 1 wherein the step of establishing the target acceleration feed-forward value comprises using a pre-calibrated gain factor and includes the step of filtering the product of the desired engine speed and the acceleration gain factor to establish an acceleration saturation limit for the target acceleration.

5. The method set forth in claim 2 wherein the step of establishing the target acceleration feed-forward value comprises using a pre-calibrated gain factor and includes the step of filtering the product of the desired engine speed and the acceleration gain factor to establish an acceleration saturation limit for the target acceleration.

6. The method set forth in claim 3 wherein the step of establishing the target acceleration feed-forward value comprises using a pre-calibrated gain factor and includes the step of filtering the product of the desired engine speed and the acceleration gain factor to establish an acceleration saturation limit for the target acceleration.

7. A method for controlling engagement of a centrifugal master clutch in a vehicle powertrain having a throttle-controlled internal combustion engine, a multiple-ratio transmission and a master clutch controller for controlling clutch engagement during launch and acceleration as torque from the engine is delivered to a torque input member of the transmission, and an engine controller responding to operating variables that are determined in successive control loops, the engine having a driver operated vehicle acceleration pedal, the method comprising:
    calculating an engine speed request;
    converting the engine speed request to an engine torque request; and
    developing an engine control command that is responsive to changes in engine torque request whereby launch of the vehicle is characterized by controlled and timed clutch engagement that effects engagement smoothness;
    the step of converting the engine speed request to an engine torque request comprising establishing a target acceleration feed forward value by converting the engine speed request using a precalculated acceleration gain factor;
    integrating the target acceleration feed forward value to obtain a target engine speed;
    comparing target engine speed to actual engine speed to determine a speed error;
    converting speed error to a speed error feed forward torque;
    converting the target acceleration feed forward value to an inertia feed-forward torque; and
    combining speed error feed-forward torque, inertia feed-forward torque and an engine friction feed-forward torque, to effect the torque request.

8. The method set forth in claim 7 wherein the friction feed-forward torque is determined by multiplying target engine speed by an engine friction coefficient.

9. The method set forth in claim 8 wherein the inertia feed-forward torque is determined by multiplying target feed-forward acceleration by a calibrated engine inertia parameter indicative of mass of rotary elements of the engine.

10. The method set forth in claim 7 wherein the step of establishing the target acceleration feed-forward value comprises using a pre-calibrated gain factor and includes the step of filtering the product of the desired engine speed and the acceleration gain factor to establish an acceleration saturation limit for the target acceleration.

11. The method set forth in claim 8 wherein the step of establishing the target acceleration feed-forward value comprises using a pre-calibrated gain factor and includes the step of filtering the product of the desired engine speed and the acceleration gain factor to establish an acceleration saturation limit for the target acceleration.

12. The method set forth in claim 9 wherein the step of establishing the target acceleration feed-forward value comprises using a pre-calibrated gain factor and includes the step of filtering the product of the desired engine speed and the acceleration gain factor to establish an acceleration saturation limit for the target acceleration.

* * * * *